(12) United States Patent
Xu et al.

(10) Patent No.: US 10,715,730 B1
(45) Date of Patent: Jul. 14, 2020

(54) DAMPER ARRANGEMENT FOR ACTUATOR DAMPING

(71) Applicant: Apple Inc., Cupertino, CA (US)

(72) Inventors: Bin Xu, Santa Clara, CA (US); Qiang Yang, Fremont, CA (US); Yoshiyuki Takase, Tokyo (JP); Aurelien R. Hubert, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 131 days.

(21) Appl. No.: 15/940,725

(22) Filed: Mar. 29, 2018

Related U.S. Application Data

(60) Provisional application No. 62/478,484, filed on Mar. 29, 2017.

(51) Int. Cl.
| | | |
|---|---|---|
| *H04N 5/232* | (2006.01) | |
| *G03B 17/56* | (2006.01) | |
| *G02B 27/64* | (2006.01) | |
| *G02B 7/08* | (2006.01) | |
| *G02B 7/10* | (2006.01) | |
| *H04N 5/225* | (2006.01) | |

(Continued)

(52) U.S. Cl.
CPC .......... *H04N 5/23287* (2013.01); *G02B 7/08* (2013.01); *G02B 7/09* (2013.01); *G02B 7/10* (2013.01); *G02B 27/646* (2013.01); *G03B 17/561* (2013.01); *G03B 17/566* (2013.01); *H04N 5/2254* (2013.01); *H04N 5/2257* (2013.01); *H04N 5/23212* (2013.01); *G02B 13/001* (2013.01); *G03B 2205/0015* (2013.01)

(58) Field of Classification Search
CPC . G02B 7/023; G02B 7/04; G02B 7/09; G02B 7/10; G02B 7/08; G02B 27/646; G02B 13/001; G03B 17/02; G03B 3/02; G03B 17/566; G03B 17/561; G03B 2205/0015; F16F 1/18; F16F 1/368; G11B 23/08721; G11B 23/08728; B60J 3/0265; H04N 5/23287; H04N 5/2257; H04N 5/23212; H04N 5/2254
See application file for complete search history.

(56) References Cited

U.S. PATENT DOCUMENTS

| | | |
|---|---|---|
| 7,830,414 B2 | 11/2010 | Inoue et al. |
| 8,218,018 B2 | 7/2012 | Washisu |
| 8,823,815 B1 | 9/2014 | Sekimoto |

(Continued)

*Primary Examiner* — Joseph P Martinez
(74) *Attorney, Agent, or Firm* — Robert C. Kowert; Kowert, Hood, Munyon, Rankin & Goetzel, P.C.

(57) ABSTRACT

Various embodiments include a damper arrangement that may be used to dampen motions of a dynamic component. In some embodiments, the damper arrangement may be used in a camera module that includes a stationary component and a dynamic component. For instance, the dynamic component may hold a lens such that the lens moves together with the dynamic component. In various examples, the damper arrangement may include an interface member that extends from the stationary component or the dynamic component to at least partially into a viscoelastic material within a pocket configured in the stationary component, the dynamic component, or both. The interface member may be configured to traverse within the viscoelastic material to dampen motion of the dynamic component, for example, during operation of a lens actuator to move the dynamic component along an optical axis of the lens.

20 Claims, 10 Drawing Sheets

(51) Int. Cl.
  *G02B 7/09* (2006.01)
  *G02B 13/00* (2006.01)

(56) References Cited

U.S. PATENT DOCUMENTS

| | | | |
|---|---|---|---|
| 2004/0174614 A1* | 9/2004 | Hovanky | G02B 7/102 |
| | | | 359/694 |
| 2016/0011394 A1 | 1/2016 | Cho et al. | |
| 2016/0241787 A1 | 8/2016 | Sekimoto | |

* cited by examiner

DAMPER ARRANGEMENT FOR ACTUATOR DAMPING

This application claims benefit of priority to U.S. Provisional Application No. 62/478,484, filed Mar. 29, 2017, titled "Damper Arrangement for Actuator Damping", which is hereby incorporated by reference in its entirety.

BACKGROUND

Technical Field

This disclosure relates generally to control of the motion of camera components.

Description of the Related Art

The advent of small, mobile multipurpose devices such as smartphones and tablet or pad devices has resulted in a need for high-resolution, small form factor cameras for integration in the devices. Some small form factor cameras may incorporate optical image stabilization (OIS) mechanisms that may sense and react to external excitation/disturbance by adjusting location of the optical lens on the X and/or Y axis in an attempt to compensate for unwanted motion of the lens. Some small form factor cameras may incorporate an autofocus (AF) mechanism whereby the object focal distance can be adjusted to focus an object plane in front of the camera at an image plane to be captured by the image sensor. In some such autofocus mechanisms, the optical lens is moved as a single rigid body along the optical axis (referred to as the Z axis) of the camera to refocus the camera.

SUMMARY OF EMBODIMENTS

Some embodiments include a device. The device may include a stationary component of a lens actuator, a dynamic component of the lens actuator, a pocket, and an interface member. In various examples, the dynamic component may be configured to hold one or more lens elements (e.g., a lens of a camera) and move along an optical axis of the lens elements. The pocket may be configured in the stationary component and/or the dynamic component. Furthermore, the pocket may comprise a viscoelastic material (e.g., gel, grease, etc.). The interface member may extend from the stationary component or the dynamic component to at least partially into the viscoelastic material. In some examples, the interface member may be a rigid member. Furthermore, in various embodiments, the interface member may be configured to traverse within the viscoelastic material to dampen motion of the dynamic component, e.g., during operation of the lens actuator to move the dynamic component along the optical axis.

Some embodiments include a camera module. The camera module may include a lens, an image sensor, and an actuator. The lens may include one or more lens elements that define an optical axis. The actuator may include a stationary component, a lens carrier, and a damper arrangement. The lens carrier may be configured to hold the lens and move along the optical axis.

In various embodiments, the damper arrangement may include a viscoelastic material and an interface member. The viscoelastic material may be at least partially disposed within a pocket. For instance, the pocket may be defined by the stationary component and/or the lens carrier. The interface member may extend from the stationary component and/or the lens carrier to at least partially into the viscoelastic material. In some examples, the interface member may be a rigid member. Furthermore, the interface member may be configured to traverse within the viscoelastic material to dampen motion of the lens carrier, e.g., during operation of the actuator to move the lens carrier along the optical axis.

In some embodiments, the actuator may include a voice coil motor (VCM) actuator having one or more magnets and one or more coils. The stationary component may be a magnet holder configured to hold at least one of the one or more magnets. Furthermore, in some cases, the lens carrier may hold at least one of the one or more coils proximate the magnet(s) held by the magnet holder. In some examples, the pocket may be defined by one or more surfaces of the lens carrier. An interface member may extend from the magnet holder such that a portion of the interface member is disposed within the viscoelastic material in the pocket. Movement of the lens carrier during operation of the lens actuator may be restricted (e.g., based at least in part on the interface member and the viscoelastic material) to a range of motion. In some embodiments, at least a minimum clearance may be maintained, across the range of motion, between the portion of the interface member that is disposed within the viscoelastic material and the one or more surfaces of the magnet holder that define the pocket.

Some embodiments include a system. The system may include a lens and an actuator. The lens may include one or more lens elements that define an optical axis. The actuator may include a stationary component, a dynamic component, viscoelastic material, and an interface member. The dynamic component may be configured to hold the lens and move along the optical axis. The viscoelastic material may be disposed within a pocket defined by one or more surfaces of the stationary component and/or the dynamic component. The interface member may include a first portion and a second end portion. The first end portion may extend from the stationary component or the dynamic component. The second end portion may be disposed within the viscoelastic material. In some examples, the interface member may be a rigid member.

In various embodiments, movement of the dynamic component during operation of the actuator may be restricted (e.g., based at least in part on the interface member and the viscoelastic material) to a range of motion. In some instances, at least a minimum clearance may be maintained, across the range of motion, between the second end portion of the interface member that is disposed within the viscoelastic material and the surface(s) that define the pocket. In some implementations, the system may include one or more processors configured to cause the actuator to move the dynamic component along the optical axis. The second end portion may be configured to traverse within the viscoelastic material to dampen motion of the dynamic component during operation of the actuator to move the lens along the optical axis.

Some embodiments include a method of constructing a damper arrangement of an actuator. The method may include forming a dynamic component and/or a stationary component that defines a pocket. Furthermore, the method may include forming an interface between the dynamic component and the stationary component. In various embodiments, the interface may include a viscoelastic material and an interface member that is at least partially within the viscoelastic material.

BRIEF DESCRIPTION OF THE DRAWINGS

FIG. 1A indicates piston motion of one or more dynamic components of the camera module. FIG. 1B indicates rocking motion of one or more dynamic components of the camera module.

FIG. 3A shows an exploded perspective view of some components of the camera module. FIG. 3B shows a perspective view of an exterior of the camera module.

FIG. 3C shows a cross-sectional top view of the camera module.

Figure 1A:
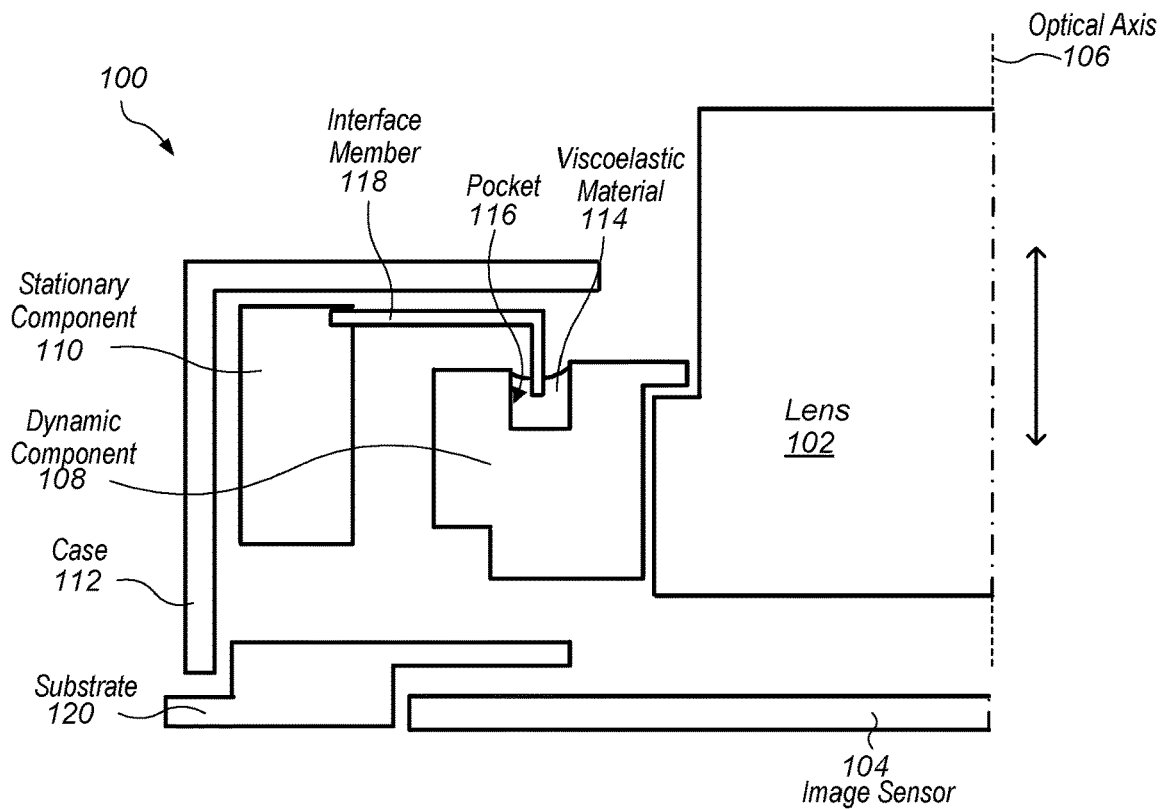
FIGS. 1A and 1B each illustrate a respective cross-sectional view of an example camera module that includes an actuator with a damper arrangement, in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Some embodiments include camera equipment outfitted with a damper arrangement that may be used to dampen motion of one or more dynamic camera components during operation of an actuator. For example, the camera may be subjected to external disturbances during operation of the actuator to move the lens along an optical axis, which may induce piston vibration and/or rocking vibration that may negatively impact camera performance. In some instances, piston vibration may impact user experience by generating a rattling noise and reducing camera reliability. Furthermore, rocking vibration may generate blurry images and long settling time. In various embodiments, the damper arrangement described herein may be used to dampen and/or cancel unfavorable motion such as piston vibration and/or rocking vibration.

In some embodiments, a device may include a stationary component of a lens actuator, a dynamic component of the lens actuator, a pocket, and an interface member. In various examples, the dynamic component may be configured to hold one or more lens elements (e.g., a lens of a camera) and move along an optical axis of the lens elements. The pocket may be configured in the stationary component and/or the dynamic component. Furthermore, the pocket may comprise a viscoelastic material (e.g., gel, grease, etc.). The interface member may extend from the stationary component or the dynamic component to at least partially into the viscoelastic material. In some examples, the interface member may be a rigid member. Furthermore, in various embodiments, the interface member may be configured to traverse within the viscoelastic material to dampen motion of the dynamic component, e.g., during operation of the lens actuator to move the dynamic component along the optical axis.

In some examples, the pocket may be defined by one or more surfaces of the dynamic component. The interface member may extend from the stationary component such that a portion of the interface member is disposed within the viscoelastic material. Movement of the dynamic component during operation of the lens actuator may be restricted (e.g., based at least in part on the interface member and the viscoelastic material) to a range of motion. In some embodiments, at least a minimum clearance may be maintained, across the range of motion, between the portion of the interface member that is disposed within the viscoelastic material and the one or more surfaces of the stationary component that define the pocket.

In some embodiments, the pocket may be defined by one or more surfaces of the stationary component. Furthermore, in some instances, the interface member may extend from the dynamic component such that a portion of the interface member is disposed within the viscoelastic material.

In various examples, the lens actuator may comprise a voice coil motor (VCM) actuator. For instance, the VCM actuator may include one or more magnets and one or more coils. In some embodiments, the stationary component of the lens actuator may be a magnet holder that is configured to hold at least one of the magnets. Furthermore, the dynamic component may be configured to hold at least one of the coils in some implementations.

In some embodiments, the device may be a mobile device (e.g., a mobile multifunction device). The mobile device may include a camera module. The lens elements and the lens actuator may be part of the camera module. The camera module may further include an image sensor configured to capture light passing through the lens elements and convert the captured light into image signals. The mobile device may further include a display and one or more processors.

In some cases, the processors may be configured to cause the lens actuator to move the dynamic component and/or the lens along the optical axis, e.g., to provide autofocus functionality. Additionally, or alternatively, the processors may be configured to cause the lens actuator to move the dynamic component in directions orthogonal to the optical axis and/or to cause the lens actuator to tilt the dynamic component relative to the optical axis. In some examples, the processors may be configured to cause the display to present an image based at least in part on one or more image signals from the image sensor.

In some embodiments, a camera module may include a lens, an image sensor, and an actuator. The lens may include one or more lens elements that define an optical axis. The actuator may include a stationary component, a lens carrier, and a damper arrangement. The lens may include one or more lens elements that define an optical axis. The lens carrier may be configured to hold the lens and move along the optical axis.

In various embodiments, the damper arrangement may include a viscoelastic material and an interface member. The viscoelastic material may be at least partially disposed within a pocket. For instance, the pocket may be defined by the stationary component and/or the lens carrier. The interface member may extend from the stationary component and/or the lens carrier to at least partially into the viscoelastic material. In some examples, the interface member may be a rigid member. Furthermore, the interface member may be configured to traverse within the viscoelastic material to dampen motion of the lens carrier, e.g., during operation of the actuator to move the lens carrier along the optical axis.

In some examples, the interface member may include a first portion and a second portion. The first portion may be disposed within the viscoelastic material, and the second portion may be disposed outside of the viscoelastic material. In some examples, the first portion may have a first cross-sectional area, and the second portion may have a second cross-sectional area that is different than the first cross-sectional area.

In some embodiments, the interface member may be one of multiple interface members of the damper arrangement. For instance, the interface members may include a first pair of interface members and a second pair of interface members. The second pair of interface members may be opposite the first pair of interface members relative to the lens. In some examples, the damper arrangement may include respective viscoelastic material portions disposed within respective pockets. Each interface member may include a respective portion that is disposed within a respective pocket.

In some cases, each interface member of the first pair of interface members may include a portion that is disposed within the viscoelastic material. Similarly, each interface member of the second pair of interface members has a portion that is disposed within the viscoelastic material. In some embodiments, each interface member of the first pair of interface members may have a first cross-sectional shape, and each interface member of the second pair of interface members may have a second cross-sectional shape that is different than the first cross-sectional shape. In some examples, the first pair of interface members may be arranged in a first orientation, and the second pair of interface members may be arranged in a second orientation that is different than the first orientation. In some embodiments, the first pair of interface members may include a first interface member that has a first cross-sectional shape and a first orientation, and a second interface member that has a second cross-sectional shape and a second orientation. The first cross-sectional shape may be different than the second cross-sectional shape in some embodiments. Additionally, or alternatively, the first orientation may be different than the second orientation in some cases.

According to some examples, the damper arrangement may further include a third pair of interface members and a fourth pair of interface members. The fourth pair of interface members may be opposite the third pair of interface members relative to the lens.

In some embodiments, the actuator may include a voice coil motor (VCM) actuator having one or more magnets and one or more coils. The stationary component may be a magnet holder configured to hold at least one of the one or more magnets. Furthermore, in some cases, the lens carrier may hold at least one of the one or more coils proximate the magnet(s) held by the magnet holder. In some examples, the pocket may be defined by one or more surfaces of the lens carrier. An interface member may extend from the magnet holder such that a portion of the interface member is disposed within the viscoelastic material in the pocket. Movement of the lens carrier during operation of the lens actuator may be restricted (e.g., based at least in part on the interface member and the viscoelastic material) to a range of motion. In some embodiments, at least a minimum clearance may be maintained, across the range of motion, between the portion of the interface member that is disposed within the viscoelastic material and the one or more surfaces of the magnet holder that define the pocket.

According to some embodiments, the actuator (or another actuator of the camera module) may be configured to move the lens carrier, relative to the image sensor, in one or more directions orthogonal to the optical axis. Additionally, or alternatively, the actuator (or another actuator of the camera module) may be configured to move the image sensor, relative to the lens carrier, in one or more directions orthogonal to the optical axis. Furthermore, in some embodiments, the actuator (or another actuator of the camera module) may be configured to tilt the lens carrier and/or the image sensor relative to the optical axis.

In some embodiments, a system may include a lens and an actuator. The lens may include one or more lens elements that define an optical axis. The actuator may include a stationary component, a dynamic component, viscoelastic material, and an interface member. The dynamic component may be configured to hold the lens and move along the optical axis. The viscoelastic material may be disposed within a pocket defined by one or more surfaces of the stationary component and/or the dynamic component. The interface member may include a first portion and a second end portion. The first end portion may extend from the stationary component or the dynamic component. The second end portion may be disposed within the viscoelastic material. In some examples, the interface member may be a rigid member such that the interface member does not bend or flex as the actuator moves during normal device operation.

Figure 2:
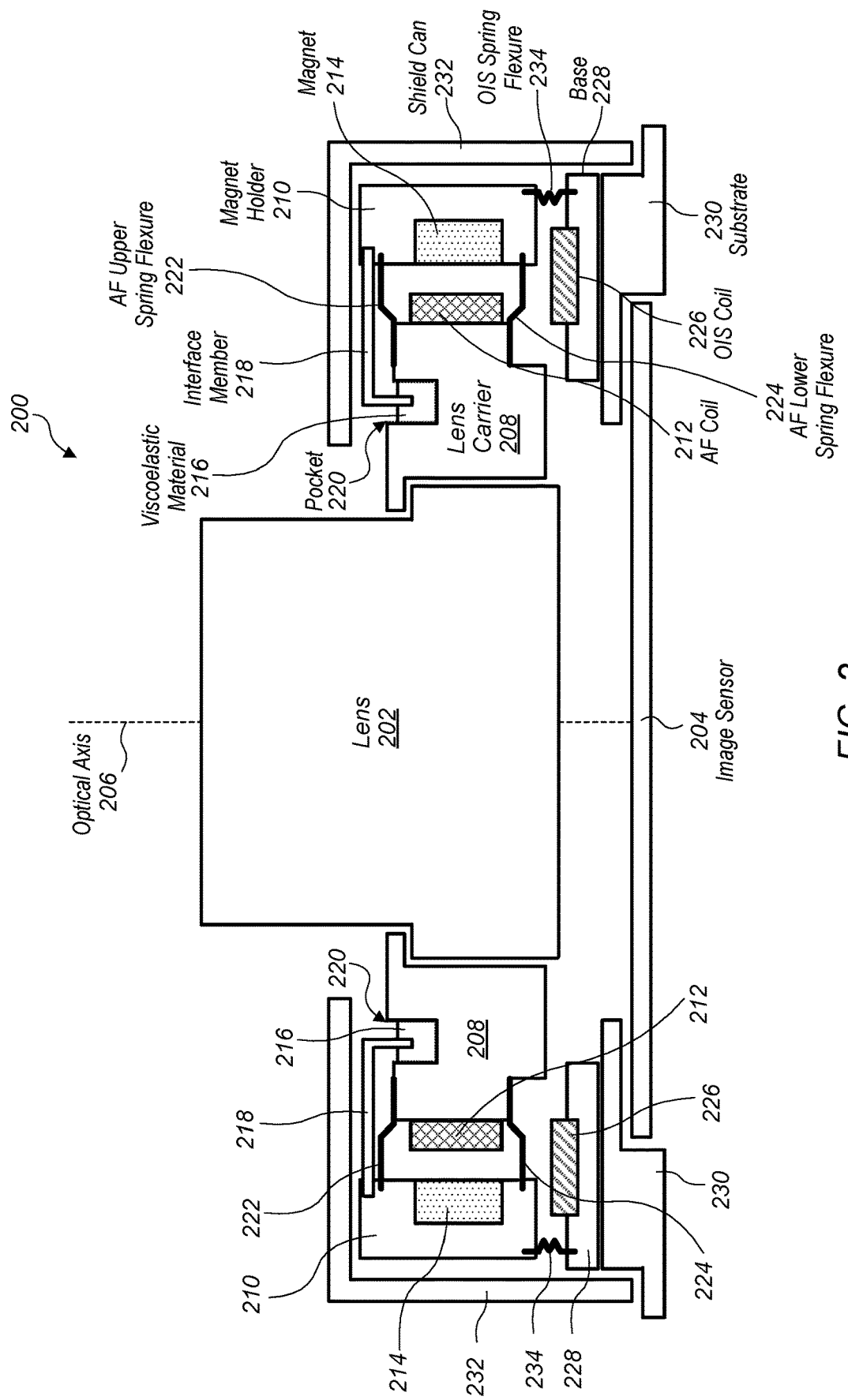
FIG. 2 illustrates a cross-sectional side view of another example camera module that includes an actuator with a damper arrangement, in accordance with some embodiments.

In various embodiments, movement of the dynamic component during operation of the actuator may be restricted (e.g., based at least in part on the interface member and the viscoelastic material) to a range of motion. In some instances, at least a minimum clearance may be maintained, across the range of motion, between the second end portion of the interface member that is disposed within the viscoelastic material and the surface(s) that define the pocket. In some embodiments, a spring/suspension mechanism (such as shown in FIG. 2) may be configured to restrict motion to maintain the minimum clearance during normal operation. In some implementations, the system may include one or more processors configured to cause the actuator to move the dynamic component along the optical axis. The second end portion may be configured to traverse within the viscoelastic material to dampen motion of the dynamic component during operation of the actuator to move the lens along the optical axis. In some embodiments, during normal device operation the one or more processors control actuator movement to maintain the minimum clearance between the second end portion of the interface member that is disposed within the viscoelastic material and the surface(s) that define the pocket.

In some examples, the interface member may include an intermediate portion extending between the first end portion and the second end portion. The intermediate portion may include a bend such that the first end portion extends in a first direction, and the second end portion extends in a second direction that is different than the first direction. For instance, the first direction may be orthogonal to the second direction.

In some embodiments, a method of constructing a damper arrangement of an actuator may include forming a dynamic component and/or a stationary component that defines a pocket. The method may include forming an interface between the dynamic component and the stationary component. In various embodiments, the interface may include a viscoelastic material and an interface member that is at least partially within the viscoelastic material.

In some examples, to form the interface between the dynamic component and the stationary component, the method may include placing the interface member at least partially within the pocket. The method may also include placing the viscoelastic material at least partially within the pocket. For instance, the viscoelastic material may be placed within the pocket such that the interface member is at least partially within the viscoelastic material. Furthermore, the method may include curing the viscoelastic material in some instances.

In other examples, to form the interface between the dynamic component and the stationary component, the method may include placing the viscoelastic material at least partially within the pocket. The method may also include placing the interface member at least partially within the viscoelastic material. Furthermore, the method may include curing the viscoelastic material in some instances.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Figure 1B:
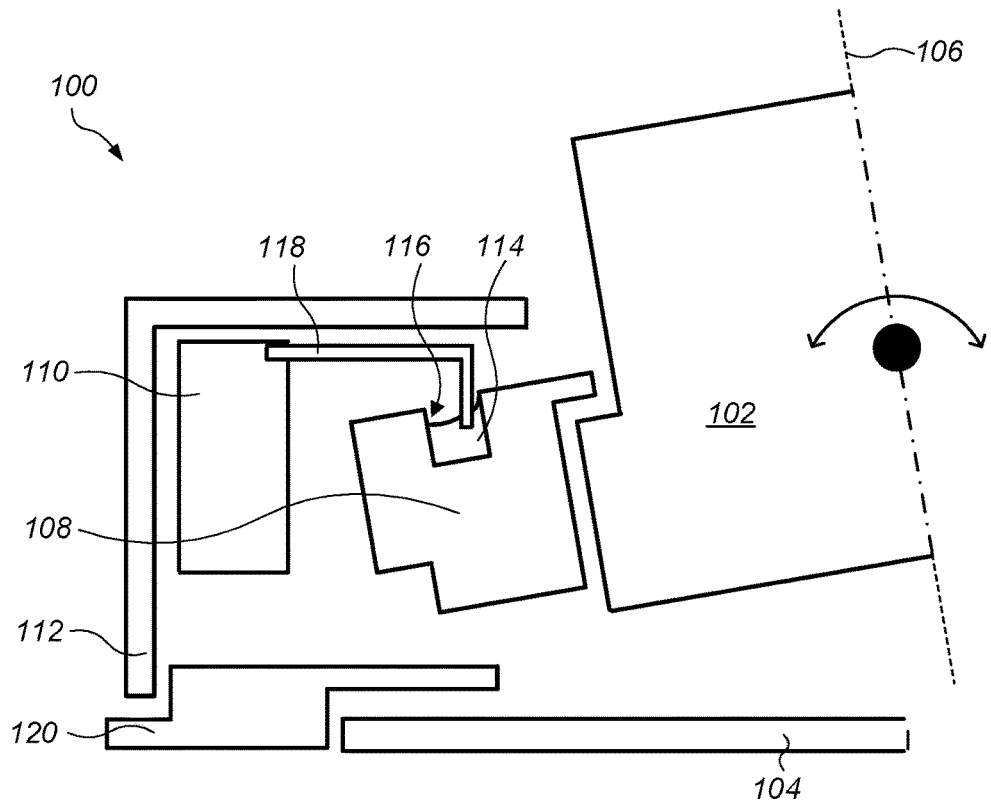

FIGS. 1A and 1B each illustrate a respective cross-sectional view of an example camera module 100 that includes an actuator with a damper arrangement, in accordance with some embodiments. FIG. 1A indicates piston motion of one or more dynamic components of the camera module 100. FIG. 1B indicates rocking motion of one or more dynamic components of the camera module 100. In some embodiments, the camera module 100 may include one or multiple features, components, and/or functionality of embodiments described herein with reference to FIGS. 2-10.

In some examples, piston vibration of the dynamic component is induced by external disturbances to the camera module 100, e.g., as shown in FIG. 1A. Additionally, or alternatively, external disturbances to the camera module 100 may induce rocking vibrations of the dynamic component, e.g., as shown in FIG. 1B. In various embodiments, the piston vibrations and/or the rocking vibrations may occur during operation of the actuator to move the dynamic component along an optical axis.

In various embodiments, the camera module 100 may include a lens 102, an image sensor 104, and an actuator (e.g., a lens actuator such as the voice coil motor actuator described below with reference to FIG. 2). The lens 102 may include one or more lens elements that define an optical axis 106. In some cases, the actuator may include a dynamic component 108 (e.g., the lens carrier described below with reference to FIG. 2), a stationary component 110 (e.g., the magnet holder described below with reference to FIG. 2), and a damper arrangement. The dynamic component 108 may hold the lens 102 such that the lens 102 moves together with the dynamic component 108. In some instances, the stationary component 110 may be stationary relative to the dynamic component 108. For instance, the stationary component 110 may be attached to a fixed member, such as a case 112 that at least partially encompasses the camera module 100. The actuator may be configured to move the dynamic component 108 relative to the stationary component 110 and/or the image sensor 104. For example, the actuator may move the dynamic component 108 (and/or the lens 102) along the optical axis 106 and/or in directions orthogonal to the optical axis 106. Additionally, or alternatively, the actuator may be configured to tilt the dynamic component 108 (and/or the lens 102) relative to the optical axis 106. In some embodiments, the stationary component 110 may be stationary relative to dynamic component 108 for one or more degrees of freedom, but may also be moveable with dynamic component 108 in one or more other degrees of freedom with respect to another portion of camera module 100 (e.g., the dynamic component, but not the stationary component, is moveable along the optical axis for autofocus, while the stationary component, the dynamic component and lens move together orthogonal to the optical axis for optical image stabilization).

In some embodiments, the damper arrangement may include a viscoelastic material 114 (e.g., gel, grease, etc.) at an interface between the dynamic component 108 and the stationary component 110. For instance, the viscoelastic material 114 may be at least partially disposed within a pocket 116 defined by the dynamic component 108 and/or the stationary component 110. FIGS. 1A and 1B show the pocket 116 defined by the dynamic component 108. It should be understood, however, that the stationary component 110 may additionally, or alternatively, define a pocket 116, e.g., as described below with reference to FIGS. 4 and 5.

According to various examples, the damper arrangement may include an interface member 118 that extends from the stationary component 110 and/or the dynamic component 108 to at least partially into the viscoelastic material 114. For instance, FIGS. 1A and 1B show the interface member 118 extending from the stationary component 110 such that an end portion of the interface member 118 is embedded in the viscoelastic material 114 within the pocket 116. It should be understood, however, that the interface member 118 may additionally, or alternatively, extend from the dynamic component 108, e.g., as described below with reference to FIGS. 4 and 5.

In various embodiments, the interface member 118 may be configured to traverse within the viscoelastic material 114 to dampen motion of the dynamic component 108, e.g., during operation of the actuator to move the dynamic component 108 along the optical axis 106. In some examples, movement of the dynamic component 108 during operation of the actuator may be restricted (e.g., based on at least in part on the interface member 118 and the viscoelastic material 114) to a range of motion. As such, at least a minimum clearance may be maintained, across the range of motion, between the portion of the interface member 118 that is disposed within the viscoelastic material 114 and the surface(s) that define the pocket 116. In some embodiments, the damper structure may dampen and/or cancel piston vibrations, e.g., the piston vibrations indicated in FIG. 1A. Additionally, or alternatively, the damper structure may dampen and/or cancel rocking vibrations, e.g., the rocking vibrations indicated in FIG. 1B.

In some embodiments, the camera module 100 may further include a substrate 120. The substrate 120 may support the image sensor 104 in some examples. For instance, the image sensor 104 may be attached to the substrate 120. Furthermore, the substrate 120 may be attached to a bottom end of the case 112 in some embodiments.

FIG. 2 illustrates a cross-sectional side view of another example camera module 200 that includes an actuator with a damper arrangement, in accordance with some embodiments. In some embodiments, the camera module 200 may include one or multiple features, components, and/or functionality of embodiments described herein with reference to FIGS. 1A, 1B, and 3-10.

According to various embodiments, the camera module 200 may include a lens 202, an image sensor 204, and a voice coil motor (VCM) actuator. The lens 202 may include one or more lens elements that define an optical axis 206. In some cases, the VCM actuator may include a dynamic component (e.g., lens carrier 208), a stationary component (e.g., magnet holder 210), and a damper arrangement. In some embodiments, the lens carrier 208 may be configured to hold the lens 102 such that the lens 102 moves together with the lens carrier 208. Furthermore, the lens carrier 208 may be configured to hold one or more coils of the VCM actuator. For instance, one or more autofocus coils 212 of the VCM actuator may be coupled to the lens carrier 208. In some embodiments, the magnet holder 210 may be configured to hold one or more magnets of the VCM actuator. In some examples, each autofocus coil 212 may be located proximate a respective magnet 214. The camera module 200 may be configured to provide current to the autofocus coil(s) 212, which may cause the autofocus coil(s) 212 to magnetically interact with the magnet(s) 214, e.g., to produce Lorentz forces that cause the lens carrier 208 to move along the optical axis 206 to provide autofocus functionality.

In various examples, the damper arrangement may include a viscoelastic material 216 and an interface member 218. The viscoelastic material 216 may be at least partially disposed within a pocket 220 that is defined by the lens carrier 208 and/or the magnet holder 210. FIG. 2 shows the pocket 220 defined by top surfaces of the lens carrier 208. However, the pocket 220 may be defined by other surfaces (e.g., one or more side surfaces, one or more bottom surfaces, etc.) of the lens carrier 208 and/or one or more surfaces of the magnet holder 210 in some embodiments. The interface member 218 may extend from the magnet holder 210 and/or the lens carrier 208 to at least partially into the viscoelastic material 216. For instance, FIG. 2 shows the interface member 218 extending from the magnet holder 210 such that an end portion is embedded within the viscoelastic material 216 in the pocket 220. In some embodiments, the interface member 218 may be part of the magnet holder 210. In other embodiments, the interface member 218 may be a separate component that is attached to the magnet holder 210. According to various examples, the interface member 218 may be configured to traverse within the viscoelastic material 216 to dampen motion of the lens carrier 208 during operation of the VCM actuator to move the lens carrier 208 along the optical axis 206.

In some cases, the lens carrier 208 may be at least partially supported via one or more spring flexures. For example, the lens carrier 208 may be at least partially suspended via an autofocus upper spring flexure 222 and/or an autofocus lower spring flexure 224. The autofocus upper spring flexure 222 and/or the autofocus lower spring flexure 224 may also be connected to the magnet holder 210 in some embodiments. Furthermore, the autofocus upper spring flexure 222 and/or the autofocus lower spring flexure 224 may be flexible to allow the lens carrier 208 a range of motion, e.g., along the optical axis 206.

In some embodiments, the VCM actuator may include one or more optical image stabilization (OIS) coils 226 on a base 228 and/or a substrate 230. Each of the OIS coils 226 may be disposed proximate a respective magnet 214 in some embodiments. The camera module 200 may be configured to provide current to the OIS coils 226, which may cause the OIS coils 226 to magnetically interact with the magnets 214, e.g., to produce Lorentz forces that cause the lens carrier 208 to move in directions orthogonal to the optical axis 206 to provide OIS functionality. The base 228 and/or the substrate 230 may support the image sensor 204, e.g., below the lens 202 such that light rays may pass through the lens 202 and to the image sensor 204. In some embodiments, the camera module 200 may include a shield can 232 that at least partially encompasses the camera module 200. In some cases, the base 228 and/or the substrate 230 may be connected to the shield can 232. For instance, as indicated in FIG. 2, a top surface of the substrate 230 may be attached to a bottom surface of the shield can 232. Furthermore, one or more OIS spring flexures 234 may connect the base 228 and/or the substrate 230 to the magnet holder 210. The OIS spring flexures 234 may be flexible to allow the magnet holder 210 a range of motion, e.g., in directions orthogonal to the optical axis 206.

Figure 3A:
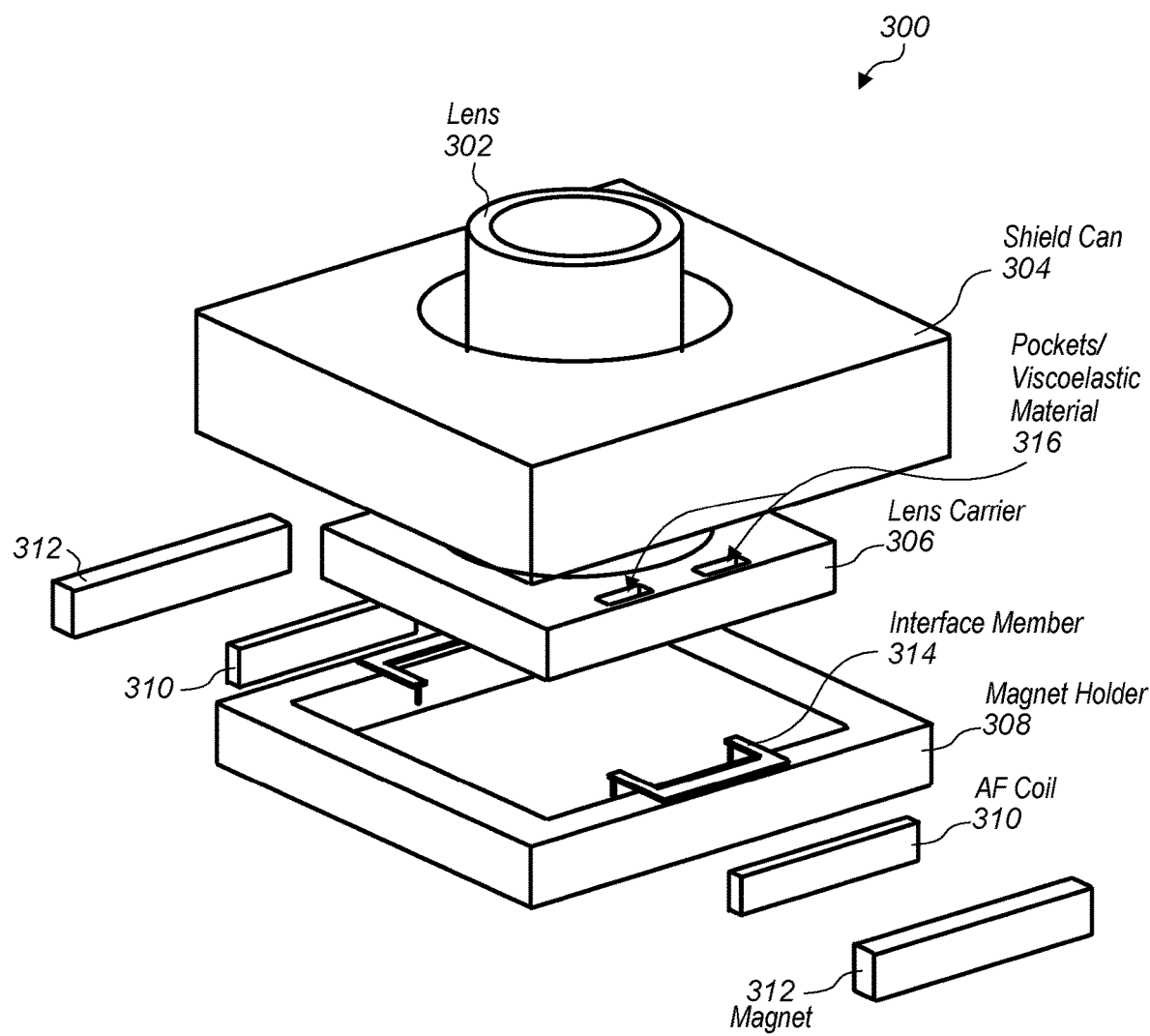
FIGS. 3A-3C each illustrates a respective view of another example camera module that includes an actuator with a damper arrangement, in accordance with some embodiments.
Figure 3B:
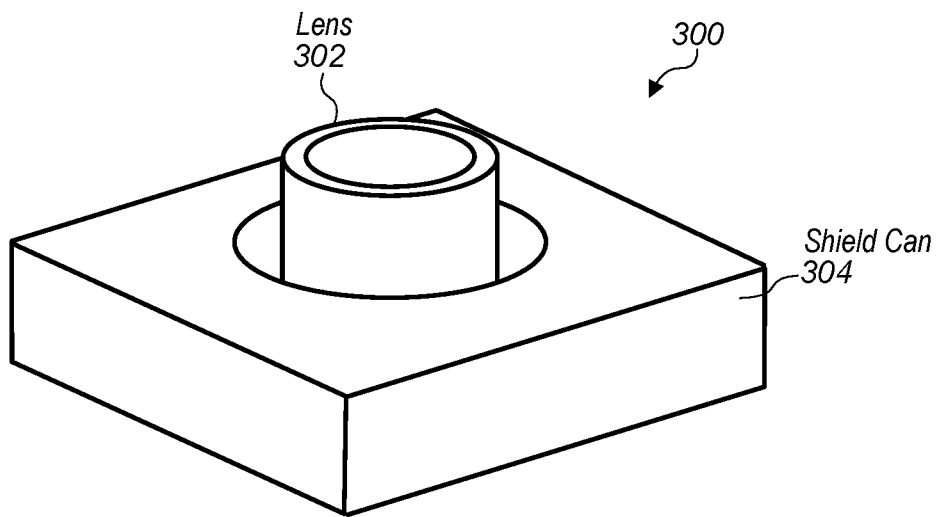
Figure 3C:
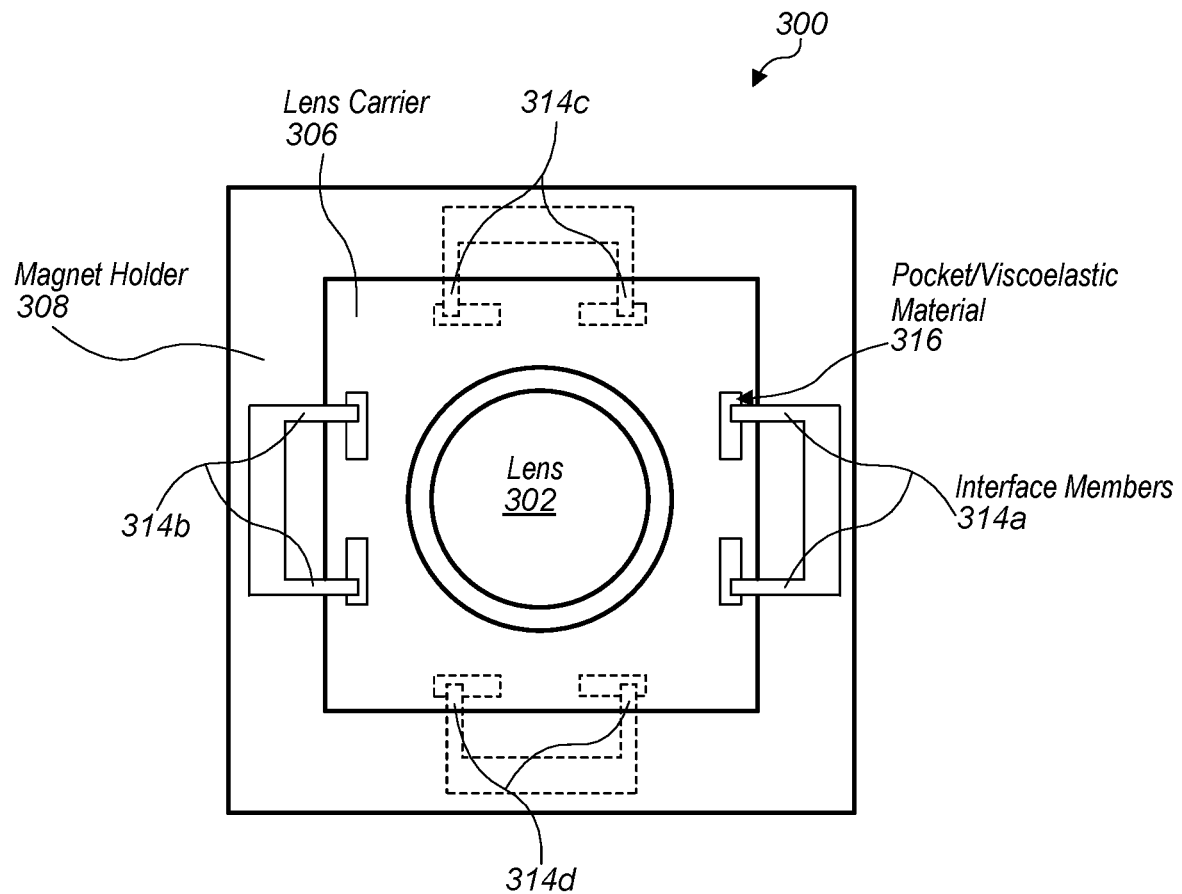

FIGS. 3A-3C each illustrates a respective view of another example camera module 300 that includes an actuator with a damper arrangement, in accordance with some embodiments. FIG. 3A shows an exploded perspective view of some components of the camera module 300. FIG. 3B shows a perspective view of an exterior of the camera module 300. FIG. 3C shows a cross-sectional top view of the camera module 300. In some embodiments, the camera module 300 may include one or multiple features, components, and/or functionality of embodiments described herein with reference to FIGS. 1A-2 and 4-10.

In various examples, the camera module 300 may include a lens 302, a shield can 304, a lens carrier 306, a magnet holder 308, and/or a damper arrangement. Furthermore, the camera module 300 may include an actuator configured to move the lens along an optical axis. For instance, the actuator may be a voice coil motor (VCM) actuator that includes one or more autofocus coils 310 and one or more magnets 312 that magnetically interact with each other to produce forces that cause the lens carrier 306 to move along the optical axis. The lens carrier 306 may hold the lens 302 such that the lens moves together with the lens carrier 306. In some examples, the lens carrier 306 may hold the autofocus coils 310, and the magnet holder 308 may hold the magnets 312.

According to various embodiments, the damper arrangement may include an interface member 314 and one or more pockets 316 comprising a viscoelastic material. The damper arrangement may provide an interface between the lens carrier 306 and the magnet holder 308. In various embodiments, the interface member 314 may be configured to traverse within the viscoelastic material to dampen motion of the lens carrier 306, e.g., during operation of the actuator to move the lens carrier 306 along the optical axis. In some examples, movement of the lens carrier 306 during operation of the actuator may be restricted (e.g., based at least in part on the interface member 314 and the viscoelastic material) to a range of motion. As such, at least a minimum clearance may be maintained, across the range of motion, between the portion of the interface member 314 that is disposed within the viscoelastic material and the surface(s) that define the pocket 316.

According to some examples, the camera module 300 may have a damper arrangement that includes multiple interface members 314 and pockets 316 comprising viscoelastic material, e.g., as shown in FIG. 3C. In some embodiments, the damper arrangement may include a first pair of interface members 314a and a second pair of interface members 314b. The second pair of interface members 314b may be opposite the first pair of interface members 314a relative to the lens 302. The damper arrangement may include respective viscoelastic material portions disposed within respective pockets, and each interface member may include a respective portion that is disposed within a respective pocket.

In some cases, each interface member of the first pair of interface members 314a may include a portion that is disposed within a respective pocket/viscoelastic material 316. Similarly, each interface member of the second pair of interface members 314b has a portion that is disposed within a respective pocket/viscoelastic material 316. In some embodiments, each interface member of the first pair of interface members 314a may have a first cross-sectional shape, and each interface member of the second pair of interface members 314b may have a second cross-sectional shape that is different than the first cross-sectional shape. In some examples, the first pair of interface members 314a may be arranged in a first orientation, and the second pair of interface members 314b may be arranged in a second orientation that is different than the first orientation. In some embodiments, the first pair of interface members 314a may include a first interface member that has a first cross-sectional shape and a first orientation, and a second interface member that has a second cross-sectional shape and a second orientation. The first cross-sectional shape may be different than the second cross-sectional shape in some embodiments. Additionally, or alternatively, the first orientation may be different than the second orientation in some cases.

According to some examples, the damper arrangement may further include a third pair of interface members 314c and a fourth pair of interface members 314d. The fourth pair of interface members 314d may be opposite the third pair of interface members 314c relative to the lens 302. While FIG. 3C shows the interface members and pockets on the top side of the structure relative to the image sensor, in other embodiments the interface members and pockets may be on the underneath side relative to the image sensor (side closer to the image sensor) or a combination of interface members and pockets may be present on both the top side and underneath side.

Figure 4:
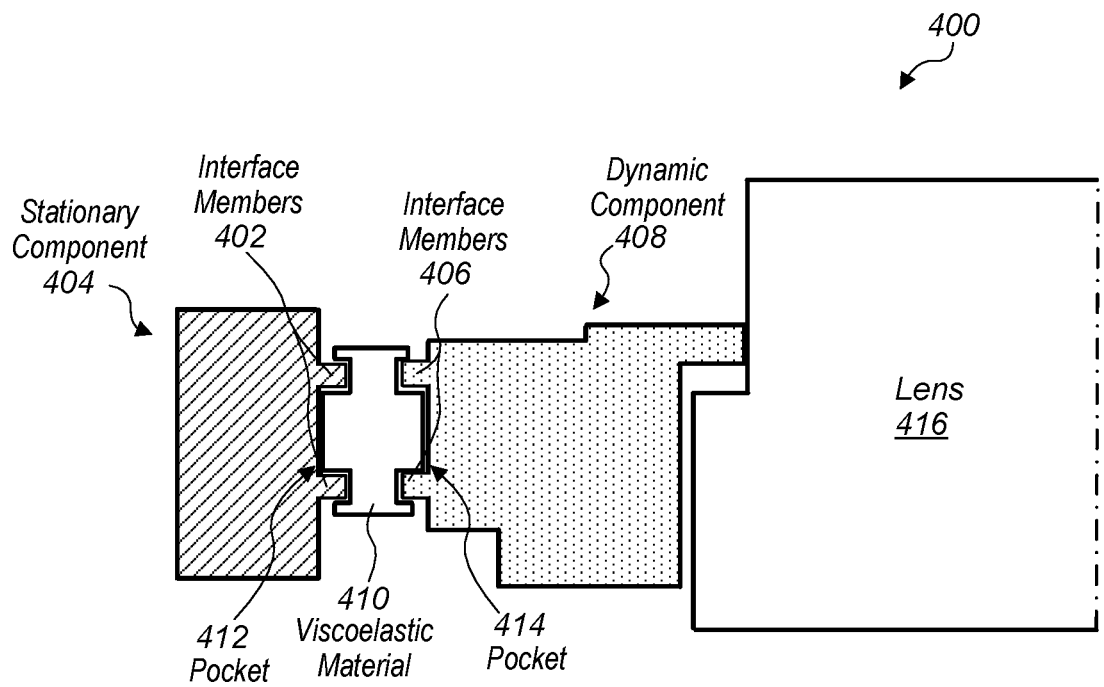
FIG. 4 illustrates a cross-sectional view of an example damper arrangement, in accordance with some embodiments.

FIG. 4 illustrates a cross-sectional view of an example damper arrangement 400, in accordance with some embodiments. In some embodiments, the damper arrangement 400 may include one or multiple features, components, and/or functionality of embodiments described herein with reference to FIGS. 1A-3C and 5-10.

According to some embodiments, the damper arrangement 400 may include a first set of one or more interface members 402 that are part of a stationary component 404, and a second set of one or more interface members 406 that are part of a dynamic component 408. The damper arrangement 400 may further include a viscoelastic material 410 disposed at least partially within one or more pockets. For instance, the stationary component 404 may define a first pocket 412 within which at least a portion of the viscoelastic material 410 may be located. Similarly, the dynamic component 408 may define a second pocket 414 within which at least a portion of the viscoelastic material 410 may be located. The viscoelastic material 410 may be sandwiched between and/or held by the stationary component 404 and the dynamic component 408 at least partially via the first pocket 412 and the second pocket 414.

In some examples, the stationary component 404, the dynamic component 408, and/or the damper arrangement 400 may be part of an actuator. For instance, the actuator may be a lens actuator. The dynamic component 408 may configured to hold a lens 416 such that the lens 416 moves together with the dynamic component 408. The lens actuator may be configured to move the dynamic component 408 (and thus the lens 416) along an optical axis of the lens 416. The dynamic component 408 may be configured to move relative to the stationary component 404 in some instances.

Figure 5:
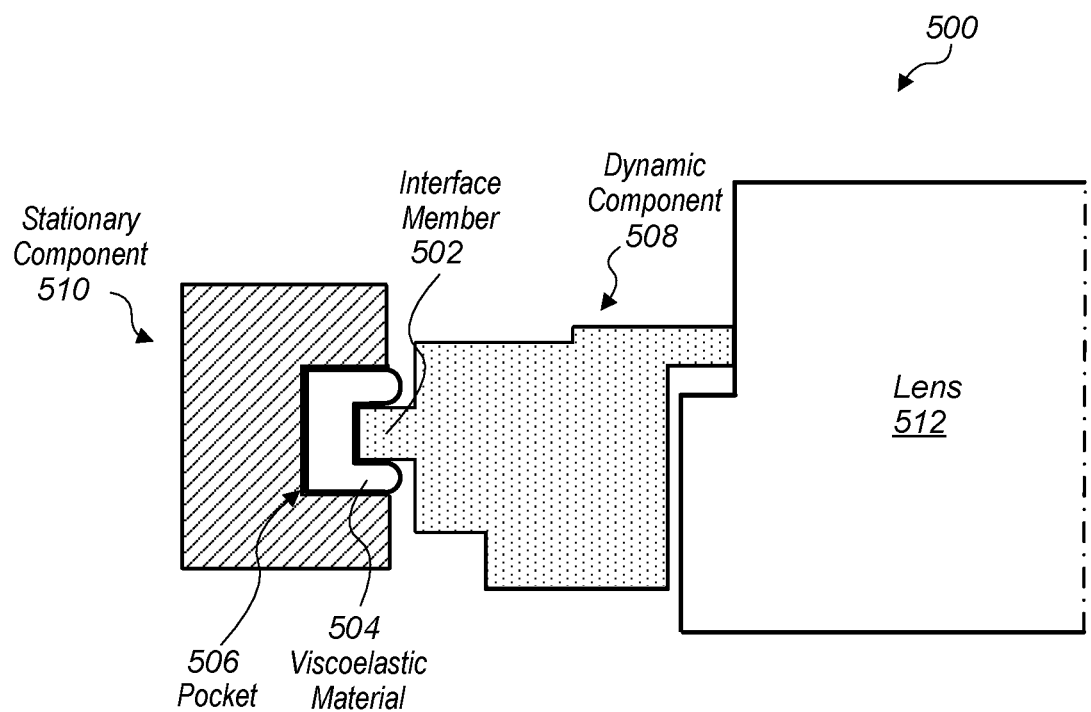
FIG. 5 illustrates a cross-sectional view of another example damper arrangement, in accordance with some embodiments.

FIG. 5 illustrates a cross-sectional view of another example damper arrangement 500, in accordance with some embodiments. In some embodiments, the damper arrangement 500 may include one or multiple features, components, and/or functionality of embodiments described herein with reference to FIGS. 1A-4 and 6-10.

According to some embodiments, the damper arrangement 500 may include a an interface member 502 and a viscoelastic material 504 disposed at least partially within a pocket 506. The interface member 502 may be part of a dynamic component 508. Furthermore, the pocket 506 may be defined by a stationary component 510. As indicated in FIG. 5, a portion of the viscoelastic material 504 may protrude outside of the pocket 506 in some instances.

In some examples, the stationary component 510, the dynamic component 508, and/or the damper arrangement 500 may be part of an actuator. For instance, the actuator may be a lens actuator. The dynamic component 508 may configured to hold a lens 512 such that the lens 512 moves together with the dynamic component 508. The lens actuator may be configured to move the dynamic component 508 (and thus the lens 512) along an optical axis of the lens 512. The dynamic component 508 may be configured to move relative to the stationary component 510 in some instances.

Figure 6:
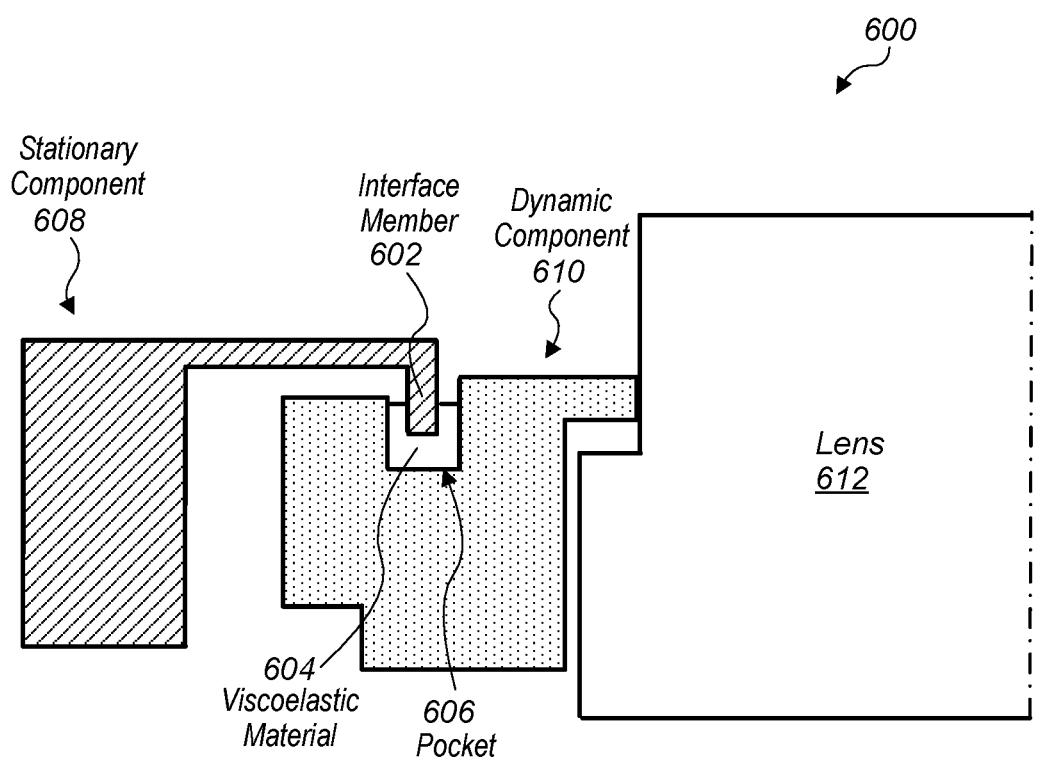
FIG. 6 illustrates a cross-sectional view of yet another example damper arrangement, in accordance with some embodiments.

FIG. 6 illustrates a cross-sectional view of yet another example damper arrangement 600, in accordance with some embodiments. In some embodiments, the damper arrangement 600 may include one or multiple features, components, and/or functionality of embodiments described herein with reference to FIGS. 1A-5 and 7-10.

According to some embodiments, the damper arrangement 600 may include a an interface member 602 and a viscoelastic material 604 disposed at least partially within a pocket 606. The interface member 602 may be part of a stationary component 608. Furthermore, the pocket 606 may be defined by a dynamic component 610. As indicated in FIG. 6, the viscoelastic material 604 may be located completely within the pocket 606 in some instances.

In some examples, the stationary component 608, the dynamic component 610, and/or the damper arrangement 600 may be part of an actuator. For instance, the actuator may be a lens actuator. The dynamic component 610 may configured to hold a lens 612 such that the lens 612 moves together with the dynamic component 610. The lens actuator may be configured to move the dynamic component 610 (and thus the lens 612) along an optical axis of the lens 612. The dynamic component 610 may be configured to move relative to the stationary component 608 (and the interface member 602) in some instances.

Figure 7:
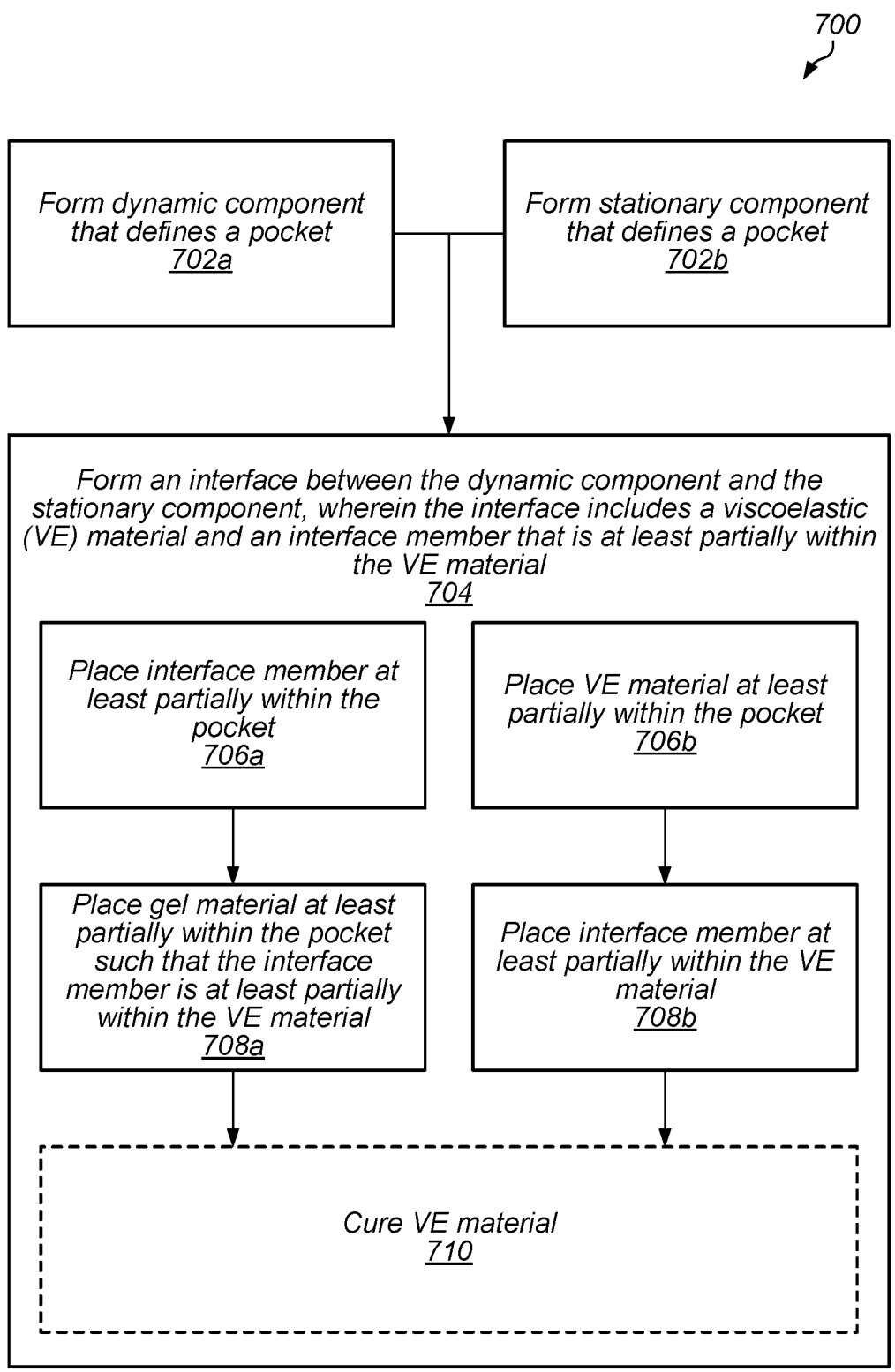
FIG. 7 is a flowchart of an example method of constructing a damper arrangement, in accordance with some embodiments.

FIG. 7 is a flowchart of an example method 700 of constructing a damper arrangement, in accordance with some embodiments. In some embodiments, the method 700 may include one or multiple features, components, and/or functionality of embodiments described herein with reference to FIGS. 1-6 and 8-10.

At 702*a*, the method 700 may include forming a dynamic component that defines a pocket. Additionally, or alternatively, the method 700 may include forming a stationary component that defines a pocket, at 702*b*.

At 704, the method 700 may include forming an interface between the dynamic component and the stationary component. In various embodiments, the interface may include a viscoelastic material and an interface member that is at least partially within the viscoelastic material.

In some embodiments, to form the interface between the dynamic component and the stationary component, the method 700 may include placing the interface member at least partially within the pocket, at 706*a*. In some instances, the interface member may be made of a metal. Furthermore, the interface member may be a rigid member and may be formed via an etching process and/or a stamping process. At 708*a*, the method 700 may include placing the viscoelastic material at least partially within the pocket. For instance, the viscoelastic material may be placed within the pocket such that the interface member is at least partially within the viscoelastic material. Furthermore, at 710, the method 700 may include curing the viscoelastic material in some instances.

In other examples, to form the interface between the dynamic component and the stationary component, the method 700 may include placing the viscoelastic material at least partially within the pocket, at 706*b*. At 708*b*, the method 700 may include placing the interface member at least partially within the viscoelastic material. Furthermore, at 710, the method 700 may include curing the viscoelastic material in some instances.

Multifunction Device Examples

Figure 8:
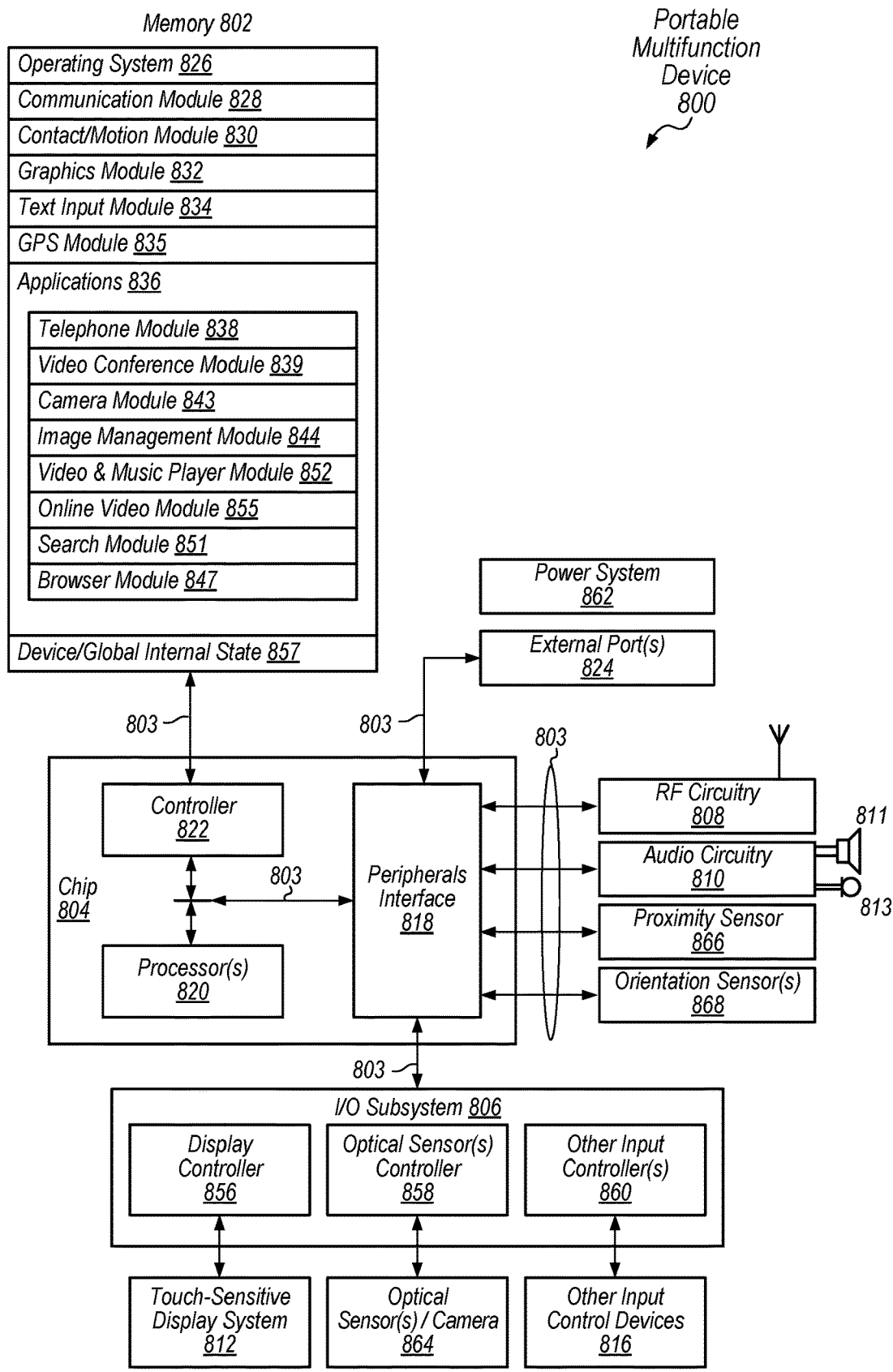
FIG. 8 illustrates a block diagram of a portable multifunction device with a camera, in accordance with some embodiments.

FIG. 8 illustrates a block diagram of a portable multifunction device 800, in accordance with some embodiments. In some embodiments, the portable multifunction device 800 may include one or multiple features, components, and/or implement functionality of embodiments described herein with reference to FIGS. 1-7, 9, and 10.

In some embodiments, the device 800 is a portable communications device, such as a mobile telephone, that also contains other functions, such as PDA, camera, video capture and/or playback, and/or music player functions. Example embodiments of portable multifunction devices include, without limitation, the iPhone®, iPod Touch®, and iPad® devices from Apple Inc. of Cupertino, Calif. Other portable electronic devices, such as laptops, cell phones, smartphones, pad or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera and/or video camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device 800 typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a streaming video application, and/or a digital video player application.

The various applications that may be executed on the device 800 may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Device 800 may include memory 802 (which may include one or more computer readable storage mediums), memory controller 822, one or more processing units (CPU's) 820, peripherals interface 818, RF circuitry 808, audio circuitry 810, speaker 811, touch-sensitive display system 812, microphone 813, input/output (I/O) subsystem 806, other input control devices 816, and external port 824. Device 800 may include one or more optical sensors or cameras 864 (e.g., one or more embodiments of the cameras described herein). These components may communicate over one or more communication buses or signal lines 803.

It should be appreciated that device 800 is only one example of a portable multifunction device, and that device 800 may have more or fewer components than shown, may combine two or more components, or may have a different configuration or arrangement of the components. The various components shown in FIG. 8 may be implemented in hardware, software, or a combination of hardware and software, including one or more signal processing and/or application specific integrated circuits.

Memory 802 may include high-speed random access memory and may also include non-volatile memory, such as one or more magnetic disk storage devices, flash memory devices, or other non-volatile solid-state memory devices. Access to memory 802 by other components of device 800, such as CPU 820 and the peripherals interface 818, may be controlled by memory controller 822.

Peripherals interface 818 can be used to couple input and output peripherals of the device to CPU 820 and memory 802. The one or more processors 820 run or execute various software programs and/or sets of instructions stored in memory 802 to perform various functions for device 800 and to process data.

In some embodiments, peripherals interface 818, CPU 820, and memory controller 822 may be implemented on a single chip, such as chip 804. In some other embodiments, they may be implemented on separate chips.

RF (radio frequency) circuitry 808 receives and sends RF signals, also called electromagnetic signals. RF circuitry 808 converts electrical signals to/from electromagnetic signals and communicates with communications networks and other communications devices via the electromagnetic signals. RF circuitry 808 may include well-known circuitry for performing these functions, including but not limited to an antenna system, an RF transceiver, one or more amplifiers, a tuner, one or more oscillators, a digital signal processor, a coder/decoder (codec) chipset, a subscriber identity module (SIM) card, memory, and so forth. RF circuitry 808 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 810, speaker 811, and microphone 813 provide an audio interface between a user and device 800. Audio circuitry 810 receives audio data from peripherals interface 818, converts the audio data to an electrical signal, and transmits the electrical signal to speaker 811. Speaker 811 converts the electrical signal to audible sound waves. Audio circuitry 810 also receives electrical signals converted by microphone 813 from sound waves. Audio circuitry 810 converts the electrical signal to audio data and transmits the audio data to peripherals interface 818 for processing. Audio data may be retrieved from and/or transmitted to memory 802 and/or RF circuitry 808 by peripherals interface 818. In some embodiments, audio circuitry 810 also includes a headset jack. The headset jack provides an interface between audio circuitry 810 and removable audio input/output peripherals, such as output-only headphones or a headset with both output (e.g., a headphone for one or both ears) and input (e.g., a microphone).

I/O subsystem 806 couples input/output peripherals on device 800, such as touch screen 812 and other input control devices 816, to peripherals interface 818. I/O subsystem 806 may include display controller 856 and one or more input controllers 860 for other input control devices 816. The one or more input controllers 860 receive/send electrical signals from/to other input control devices 816. The other input control devices 816 may include physical buttons (e.g., push buttons, rocker buttons, etc.), dials, slider switches, joysticks, click wheels, and so forth. In some alternative embodiments, input controller(s) 860 may be coupled to any (or none) of the following: a keyboard, infrared port, USB port, and a pointer device such as a mouse. The one or more buttons may include an up/down button for volume control of speaker 811 and/or microphone 813. The one or more buttons may include a push button.

Touch-sensitive display 812 provides an input interface and an output interface between the device and a user. Display controller 856 receives and/or sends electrical signals from/to touch screen 812. Touch screen 812 displays visual output to the user. The visual output may include graphics, text, icons, video, and any combination thereof (collectively termed "graphics"). In some embodiments, some or all of the visual output may correspond to user-interface objects.

Touch screen 812 has a touch-sensitive surface, sensor or set of sensors that accepts input from the user based on haptic and/or tactile contact. Touch screen 812 and display controller 856 (along with any associated modules and/or sets of instructions in memory 802) detect contact (and any movement or breaking of the contact) on touch screen 812 and converts the detected contact into interaction with user-interface objects (e.g., one or more soft keys, icons, web pages or images) that are displayed on touch screen 812. In an example embodiment, a point of contact between touch screen 812 and the user corresponds to a finger of the user.

Touch screen 812 may use LCD (liquid crystal display) technology, LPD (light emitting polymer display) technology, or LED (light emitting diode) technology, although other display technologies may be used in other embodiments. Touch screen 812 and display controller 856 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 812. In an example embodiment, projected mutual capacitance sensing technology is used, such as that found in the iPhone®, iPod Touch®, and iPad® from Apple Inc. of Cupertino, Calif.

Touch screen 812 may have a video resolution in excess of 100 dpi. In some embodiments, the touch screen has a video resolution of approximately 160 dpi. The user may make contact with touch screen 812 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen 812, device 800 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 812 or an extension of the touch-sensitive surface formed by the touch screen.

Device 800 also includes power system 862 for powering the various components. Power system 862 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 800 may also include one or more optical sensors or cameras 864. FIG. 8 shows an optical sensor coupled to optical sensor controller 858 in I/O subsystem 806. Optical sensor 864 may, for example, include charge-coupled device (CCD) or complementary metal-oxide semiconductor (CMOS) phototransistors or photosensors. Optical sensor 864 receives light from the environment, projected through one or more lenses, and converts the light to data representing an image. In conjunction with imaging module 843 (also called a camera module), optical sensor 864 may capture still images and/or video sequences. In some embodiments, at least one optical sensor may be located on the back of device 800, opposite touch screen display 812 on the front of the device. In some embodiments, the touch screen display may be used as a viewfinder for still and/or video image acquisition. In some embodiments, at least one optical sensor may instead or also be located on the front of the device.

Device 800 may also include one or more proximity sensors 866. FIG. 8 shows proximity sensor 866 coupled to peripherals interface 818. Alternatively, proximity sensor 866 may be coupled to input controller 860 in I/O subsystem 806. In some embodiments, the proximity sensor turns off and disables touch screen 812 when the multifunction device is placed near the user's ear (e.g., when the user is making a phone call).

Device 800 may also include one or more orientation sensors 868. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 800. In some embodiments, the one or more orientation sensors include any combination of orientation/rotation sensors. FIG. 8 shows the one or more orientation sensors 868 coupled to peripherals interface 818. Alternatively, the one or more orientation sensors 868 may be coupled to an input controller 860 in I/O subsystem 806. In some embodiments, information is displayed on the touch screen display in a portrait view or a landscape view based on an analysis of data received from the one or more orientation sensors.

In some embodiments, device 800 may also include one or more other sensors (not shown) including but not limited to ambient light sensors and motion detectors. These sensors may be coupled to peripherals interface 818 or, alternatively, may be coupled to an input controller 860 in I/O subsystem 806. For example, in some embodiments, device 800 may include at least one forward-facing (away from the user) and at least one backward-facing (towards the user) light sensors that may be used to collect ambient lighting metrics from the environment of the device 800 for use in video and image capture, processing, and display applications.

In some embodiments, the software components stored in memory 802 include operating system 826, communication module 828, contact/motion module (or set of instructions) 830, graphics module 832, text input module 834, Global Positioning System (GPS) module 835, and applications 836. Furthermore, in some embodiments memory 802 stores device/global internal state 857. Device/global internal state 857 includes one or more of: active application state, indicating which applications, if any, are currently active; display state, indicating what applications, views or other information occupy various regions of touch screen display 812; sensor state, including information obtained from the device's various sensors and input control devices 816; and location information concerning the device's location and/or attitude.

Operating system 826 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 828 facilitates communication with other devices over one or more external ports 824 and also includes various software components for handling data received by RF circuitry 808 and/or external port 824. External port 824 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 830 may detect contact with touch screen 812 (in conjunction with display controller 856) and other touch sensitive devices (e.g., a touchpad or physical click wheel). Contact/motion module 830 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 830 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multi-touch"/multiple finger contacts). In some embodiments, contact/motion module 830 and display controller 856 detect contact on a touchpad.

Contact/motion module 830 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 832 includes various software components for rendering and displaying graphics on touch screen 812 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 832 stores data representing graphics to be used. Each graphic may be assigned a corresponding code. Graphics module 832 receives, from applications etc., one or more codes specifying graphics to be displayed along with, if necessary, coordinate data and other graphic property data, and then generates screen image data to output to display controller 856.

Text input module 834, which may be a component of graphics module 832, provides soft keyboards for entering text in various applications that need text input.

GPS module 835 determines the location of the device and provides this information for use in various applications (e.g., to telephone module 838 for use in location-based dialing, to camera module 843 as picture/video metadata, and to applications that provide location-based services such as map/navigation applications).

Applications 836 may include one or more of, but are not limited to, the following modules (or sets of instructions), or a subset or superset thereof:

telephone module 838;
video conferencing module 839;
camera module 843 for still and/or video imaging;
image management module 844;
browser module 847;
search module 851;
video and music player module 852, which may be made up of a video player module and a music player module; and/or
online video module 855.
one or more other modules not shown, such as a gaming module.

Examples of other applications 836 that may be stored in memory 802 include but are not limited to other word processing applications, other image editing applications, drawing applications, presentation applications, communication/social media applications, map applications, JAVA-enabled applications, encryption, digital rights management, voice recognition, and voice replication.

In conjunction with RF circuitry 808, audio circuitry 810, speaker 811, microphone 813, touch screen 812, display controller 856, contact module 830, graphics module 832, and text input module 834, telephone module 838 may be used to enter a sequence of characters corresponding to a telephone number, access one or more telephone numbers in an address book, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 808, audio circuitry 810, speaker 811, microphone 813, touch screen 812, display controller 856, optical sensor 864, optical sensor controller

858, contact/motion module 830, graphics module 832, text input module 834, and telephone module 838, videoconferencing module 839 includes executable instructions to initiate, conduct, and terminate a video conference between a user and one or more other participants in accordance with user instructions.

In conjunction with touch screen 812, display controller 856, optical sensor(s) 864, optical sensor controller 858, contact/motion module 830, graphics module 832, and image management module 844, camera module 843 includes executable instructions to capture still images or video (including a video stream) and store them into memory 802, modify characteristics of a still image or video, or delete a still image or video from memory 802.

In conjunction with touch screen 812, display controller 856, contact/motion module 830, graphics module 832, text input module 834, and camera module 843, image management module 844 includes executable instructions to arrange, modify (e.g., edit), or otherwise manipulate, label, delete, present (e.g., in a digital slide show or album), and store still and/or video images.

In conjunction with RF circuitry 808, touch screen 812, display system controller 856, contact/motion module 830, graphics module 832, and text input module 834, browser module 847 includes executable instructions to browse the Internet in accordance with user instructions, including searching, linking to, receiving, and displaying web pages or portions thereof, as well as attachments and other files linked to web pages.

In conjunction with touch screen 812, display system controller 856, contact/motion module 830, graphics module 832, and text input module 834, search module 851 includes executable instructions to search for text, music, sound, image, video, and/or other files in memory 802 that match one or more search criteria (e.g., one or more user-specified search terms) in accordance with user instructions.

In conjunction with touch screen 812, display system controller 856, contact/motion module 830, graphics module 832, audio circuitry 810, speaker 811, RF circuitry 808, and browser module 847, video and music player module 852 includes executable instructions that allow the user to download and play back recorded music and other sound files stored in one or more file formats, such as MP3 or AAC files, and executable instructions to display, present or otherwise play back videos (e.g., on touch screen 812 or on an external, connected display via external port 824). In some embodiments, device 800 may include the functionality of an MP3 player, such as an iPod (trademark of Apple Inc.).

In conjunction with touch screen 812, display system controller 856, contact/motion module 830, graphics module 832, audio circuitry 810, speaker 811, RF circuitry 808, text input module 834, and browser module 847, online video module 855 includes instructions that allow the user to access, browse, receive (e.g., by streaming and/or download), play back (e.g., on the touch screen or on an external, connected display via external port 824), and otherwise manage online videos in one or more video formats, such as the H.264/AVC format or the H.265/HEVC format.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, memory 802 may store a subset of the modules and data structures identified above. Furthermore, memory 802 may store additional modules and data structures not described above.

In some embodiments, device 800 is a device where operation of a predefined set of functions on the device is performed exclusively through a touch screen and/or a touchpad. By using a touch screen and/or a touchpad as the primary input control device for operation of device 800, the number of physical input control devices (such as push buttons, dials, and the like) on device 800 may be reduced.

The predefined set of functions that may be performed exclusively through a touch screen and/or a touchpad include navigation between user interfaces. In some embodiments, the touchpad, when touched by the user, navigates device 800 to a main, home, or root menu from any user interface that may be displayed on device 800. In such embodiments, the touchpad may be referred to as a "menu button." In some other embodiments, the menu button may be a physical push button or other physical input control device instead of a touchpad.

Figure 9:
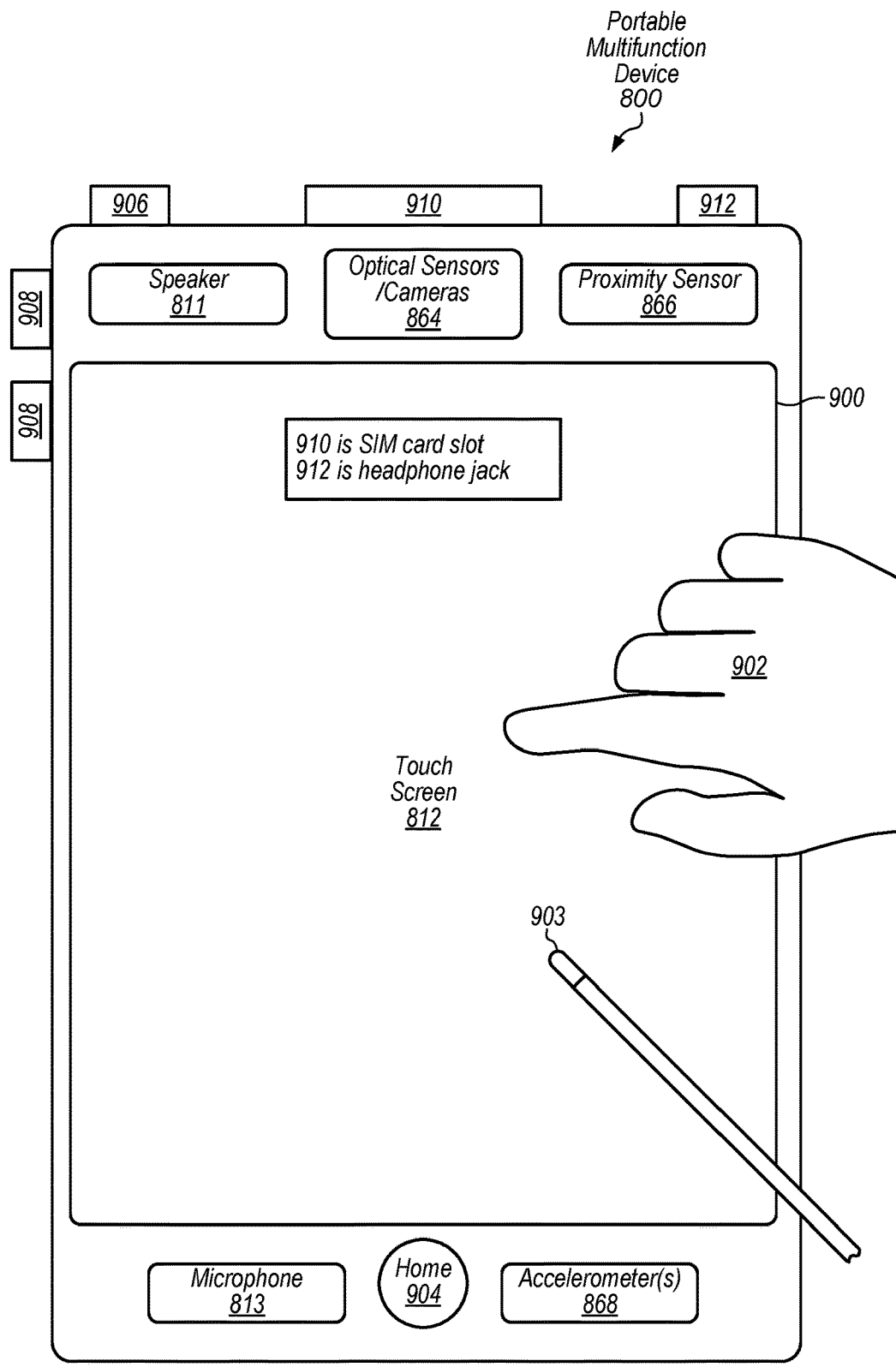
FIG. 9 depicts a portable multifunction device having a camera, in accordance with some embodiments.

FIG. 9 depicts illustrates an example portable multifunction device 800 that may include one or more cameras, in accordance with some embodiments. In some embodiments, the portable multifunction device 800 may include one or multiple features, components, and/or functionality of embodiments described herein with reference to FIGS. 1-8 and 10.

The device 800 may have a touch screen 812. The touch screen 812 may display one or more graphics within user interface (UI) 900. In this embodiment, as well as others described below, a user may select one or more of the graphics by making a gesture on the graphics, for example, with one or more fingers 902 (not drawn to scale in the figure) or one or more styluses 903 (not drawn to scale in the figure).

Device 800 may also include one or more physical buttons, such as "home" or menu button 804. As described previously, menu button 904 may be used to navigate to any application 836 in a set of applications that may be executed on device 800. Alternatively, in some embodiments, the menu button 904 is implemented as a soft key in a GUI displayed on touch screen 812.

In one embodiment, device 800 includes touch screen 812, menu button 904, push button 906 for powering the device on/off and locking the device, volume adjustment button(s) 908, Subscriber Identity Module (SIM) card slot 910, head set jack 912, and docking/charging external port 824. Push button 906 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 800 also may accept verbal input for activation or deactivation of some functions through microphone 813.

It should be noted that, although many of the examples herein are given with reference to optical sensor(s)/camera(s) 864 (on the front of a device), one or more rear-facing cameras or optical sensors that are pointed opposite from the display may be used instead of, or in addition to, an optical sensor(s)/camera(s) 864 on the front of a device.

Example Computer System

Figure 10:
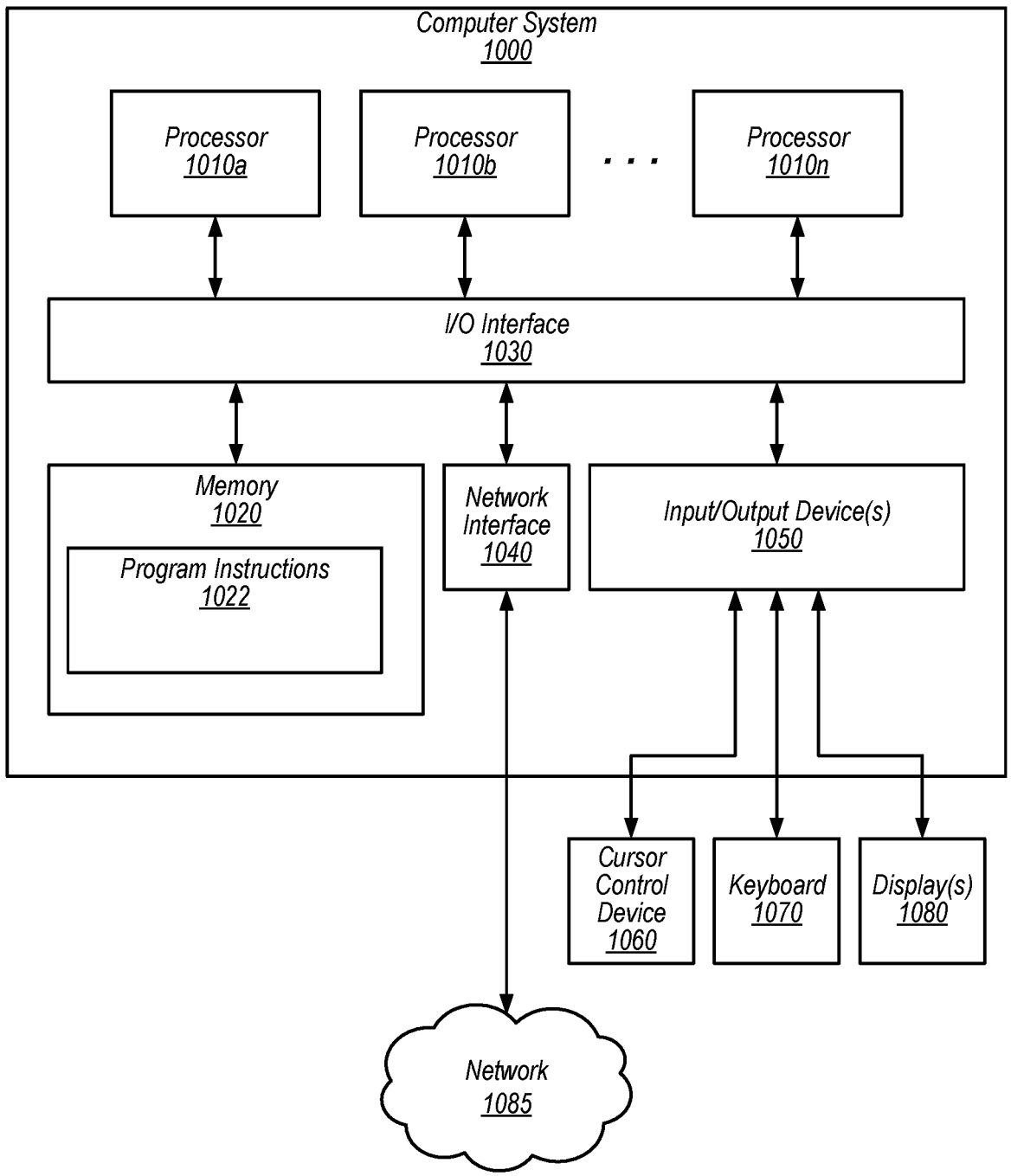
FIG. 10 illustrates an example computer system that may include a camera, in accordance with some embodiments.

FIG. 10 illustrates an example computer system 1000 that may include one or more cameras, in accordance with some embodiments. In some embodiments, the computer system 1000 may include one or multiple features, components, and/or implement functionality of embodiments described herein with reference to FIGS. 1-9.

The computer system 1000 may be configured to execute any or all of the embodiments described above. In different embodiments, computer system 1000 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, including embodiments of magnetic position sensing, as described herein may be executed in one or more computer systems 1000, which may interact with various other devices. Note that any component, action, or functionality described above with respect to FIGS. 1-9 may be implemented on one or more computers configured as computer system 1000 of FIG. 10, according to various embodiments. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some cases, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store program instructions 1022 accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. Additionally, existing camera control data 1032 of memory 1020 may include any of the information or data structures described above. In some embodiments, program instructions and/or data may be received, sent or stored upon different types of computer-accessible media or on similar media separate from system memory 1020 or computer system 1000. While computer system 1000 is described as implementing the functionality of functional blocks of previous figures, any of the functionality described herein may be implemented via such a computer system.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network 1085 (e.g., carrier or agent devices) or between nodes of computer system 1000. Network 1085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or accessing data by one or more computer systems 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1022, which may be processor-executable to implement any element or action described above. In one embodiment, the program instructions may implement the methods described above. In other embodiments, different elements and data may be included. Note that data may include any data or information described above.

Those skilled in the art will appreciate that computer system 1000 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A device, comprising:
a stationary component of a lens actuator;
a dynamic component of the lens actuator, wherein the dynamic component is configured to hold one or more lens elements and move at least along an optical axis of the one or more lens elements;
a pocket configured in at least one of the stationary component or the dynamic component, wherein the pocket comprises a viscoelastic material; and
an interface member extending from the stationary component or the dynamic component and at least partially embedded in the viscoelastic material, wherein the interface member is configured to traverse within the viscoelastic material to dampen motion of the dynamic component during operation of the lens actuator.

2. The device of claim 1, wherein:
the pocket is defined by one or more surfaces of the dynamic component; and
the interface member extends from the stationary component such that a portion of the interface member is disposed within the viscoelastic material; and
movement of the dynamic component during operation of the lens actuator is restricted, based at least in part on the interface member and the viscoelastic material, to a range of motion such that at least a minimum clearance is maintained, across the range of motion, between the portion of the interface member that is disposed within the viscoelastic material and the one or more surfaces of the stationary component that define the pocket.

3. The device of claim 1, wherein:
the pocket is defined by one or more surfaces of the stationary component; and
the interface member extends from the dynamic component such that portion of the interface member is disposed within the viscoelastic material.

4. The device of claim 1, wherein:
the lens actuator comprises a voice coil motor (VCM) actuator that includes:
one or more magnets; and
one or more coils; and
the stationary component is a magnet holder configured to hold at least one of the one or more magnets.

5. The device of claim 1, wherein:
the device is a mobile multifunction device; and
the device further includes:
a display;
a camera module, including:
the one or more lens elements;
an image sensor configured to capture light passing through the one or more lens elements and covert the captured light into image signals; and
the lens actuator; and
one or more processors configured to:
cause the lens actuator to move the dynamic component along the optical axis; and
cause the display to present an image based at least in part on one or more of the image signals from the image sensor.

6. The device of claim 1, wherein the interface member is a rigid member.

7. A camera module, comprising:
a lens that includes one or more lens elements;
an image sensor; and
an actuator, including:
a stationary component;
a lens carrier configured to hold the lens and move at least along an optical axis of the lens; and
a damper arrangement including:
viscoelastic material at least partially disposed within a pocket that is defined by at least one of the stationary component or the lens carrier; and
an interface member extending from the stationary component or the lens carrier and at least partially embedded in the viscoelastic material, wherein the interface member is configured to traverse within the viscoelastic material to dampen motion of the lens carrier during operation of the actuator.

8. The camera module of claim 7, wherein the interface member includes:
a first portion disposed within the viscoelastic material, wherein the first portion has a first cross-sectional area; and
a second portion disposed outside of the viscoelastic material, wherein the second portion has a second cross-sectional area that is different than the first cross-sectional area.

9. The camera module of claim 7, wherein:
the interface member is one of a plurality of interface members of the damper arrangement; and
the plurality of interface members include:
a first pair of interface members; and
a second pair of interface members opposite the first pair of interface members relative to the lens.

10. The camera module of claim 9, wherein:
the damper arrangement further includes respective viscoelastic material portions disposed within respective pockets; and
each interface member of the plurality of interface members includes a respective portion that is disposed within a respective pocket of the respective pockets.

11. The camera module of claim 9, wherein:
each interface member of the first pair of interface members includes a first portion that is disposed within the viscoelastic material and that has a first cross-sectional shape; and
each interface member of the second pair of interface members has a second portion that is disposed within the viscoelastic material and that has a second cross-sectional shape that is different than the first cross-sectional shape.

12. The camera module of claim 9, wherein:
the first pair of interface members are arranged in a first orientation; and
the second pair of interface members are arranged in a second orientation that is different than the first orientation.

13. The camera module of claim 9, wherein:
the first pair of interface members includes:
a first interface member that has a first cross-sectional shape and a first orientation; and
a second interface member that has a second cross-sectional shape and a second orientation;
wherein at least one of:
the first cross-sectional shape is different than the second cross-sectional shape; or
the first orientation is different than the second orientation.

14. The camera module of claim 9, wherein the plurality of interface members further include:
a third pair of interface members; and
a fourth pair of interface members opposite the third pair of interface members relative to the lens.

15. The camera module of claim 7, wherein:
the actuator comprises a voice coil motor (VCM) actuator that includes:
one or more magnets; and
one or more coils;
the stationary component is a magnet holder configured to hold at least one of the one or more magnets;

the lens carrier holds at least one of the one or more coils proximate the at least one of the one or more magnets;
the pocket is defined by one or more surfaces of the lens carrier;
the interface member extends from the stationary component such that a portion of the interface member is disposed within the viscoelastic material; and
movement of the lens carrier during operation of the actuator is restricted, based at least in part on the interface member and the viscoelastic material, to a range of motion such that at least a minimum clearance is maintained, across the range of motion, between the portion of the interface member that is disposed within the viscoelastic material and the one or more surfaces of the lens carrier that define the pocket.

16. The camera module of claim 7, wherein at least one of the actuator or another actuator of the camera module is configured to:
move the lens carrier, relative to the image sensor, in one or more directions orthogonal to the optical axis; or
move the image sensor, relative to the lens carrier, in the one or more directions orthogonal to the optical axis.

17. A system, comprising:
a lens that includes one or more lens elements;
an actuator, including:
a stationary component;
a dynamic component configured to hold the lens and move along an optical axis of the lens;
viscoelastic material disposed within a pocket defined by one or more surfaces of at least one of the stationary component or the dynamic component; and
an interface member including:
a first end portion extending from the stationary component or the dynamic component; and
a second end portion embedded within the viscoelastic material;
wherein:
the second end portion of the interface member is configured to traverse within the viscoelastic material to dampen motion of the dynamic component during operation of the actuator; and
movement of the dynamic component during operation of the actuator is restricted, based at least in part on the interface member and the viscoelastic material, to a range of motion such that at least a minimum clearance is maintained, across the range of motion, between the second end portion of the interface member that is disposed within the viscoelastic material and the one or more surfaces that define the pocket; and
one or more processors configured to cause the actuator to move the dynamic component along the optical axis.

18. The system of claim 17, wherein the interface member further includes:
an intermediate portion extending between the first end portion and the second end portion, wherein the intermediate portion includes a bend such that:
the first end portion extends in a first direction; and
the second end portion extends in a second direction that is different than the first direction.

19. The system of claim 18, wherein:
the interface member is a rigid member; and
the first direction in which the first end portion extends is orthogonal to the second direction in which the second end portion extends.

20. The system of claim 17, wherein:
the first end portion is not disposed within the viscoelastic material; and
the first end portion is at a different radial distance from the optical axis than the second end portion.

* * * * *